United States Patent
Berolini et al.

(10) Patent No.: US 10,840,018 B2
(45) Date of Patent: Nov. 17, 2020

(54) MULTILAYER ELECTRONIC DEVICE HAVING IMPROVED CONNECTIVITY AND METHOD FOR MAKING THE SAME

(71) Applicant: AVX Corporation, Fountain Inn, SC (US)

(72) Inventors: Marianne Berolini, Greenville, SC (US); Michael Kirk, Simpsonville, SC (US); Palaniappan Ravindranathan, Simpsonville, SC (US)

(73) Assignee: AVX Corporation, Fountain Inn, SC (US)

( * ) Notice: Subject to any disclaimer, the term of this patent is extended or adjusted under 35 U.S.C. 154(b) by 15 days.

(21) Appl. No.: 16/166,506

(22) Filed: Oct. 22, 2018

(65) Prior Publication Data

US 2019/0131067 A1    May 2, 2019

Related U.S. Application Data (60) Provisional application No. 62/575,626, filed on Oct. 23, 2017.

(51) Int. Cl.
*H01G 4/012* (2006.01)
*H01G 4/232* (2006.01)
*H01G 4/30* (2006.01)
*H01G 4/12* (2006.01)

(52) U.S. Cl.
CPC .............. *H01G 4/012* (2013.01); *H01G 4/12* (2013.01); *H01G 4/232* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 4,831,494 A | 5/1989 | Arnold et al. | |
| 5,880,925 A | 3/1999 | DuPré et al. | |
| 6,243,253 B1 | 6/2001 | DuPre et al. | |

(Continued)

FOREIGN PATENT DOCUMENTS

| | | | |
|---|---|---|---|
| JP | H 05138640 A | 6/1993 | |
| JP | H 07201641 A | 8/1995 | |

(Continued)

OTHER PUBLICATIONS

International Search Report and Written Opinion for PCT/US2018/056891 dated Feb. 8, 2019, 11 pages.

*Primary Examiner* — Dion Ferguson
(74) *Attorney, Agent, or Firm* — Dority & Manning, P.A.

(57) ABSTRACT

A method is disclosed for making a multilayer electronic device. The method includes placing a screen printing mask on a layer of support material and printing a conductive pattern on a layer of support material using the screen printing mask. The conductive pattern includes a plurality of electrode shapes including respective central enlarged portions. The method includes cutting the layer of support material and conductive pattern along a plurality of cutting lines intersecting the central enlarged portions such that at least one of the plurality of electrode shapes is divided into a pair of electrodes along a cutting width. The cutting width is indicative of a cutting accuracy associated with at least one of the cutting lines.

16 Claims, 6 Drawing Sheets

(56) References Cited

U.S. PATENT DOCUMENTS

| | | | |
|---|---|---|---|
| 6,380,619 B2 | 4/2002 | Ahiko et al. | |
| 7,177,137 B2 | 2/2007 | Ritter et al. | |
| 7,414,857 B2 | 8/2008 | Ritter et al. | |
| 7,463,474 B2 | 12/2008 | Ritter et al. | |
| 7,576,968 B2 | 8/2009 | Ritter et al. | |
| 8,232,479 B2 | 7/2012 | Satou | |
| 8,310,808 B2 | 11/2012 | Togashi | |
| 8,446,705 B2 | 5/2013 | Ritter et al. | |
| 9,024,206 B2 | 5/2015 | Park et al. | |
| 9,177,724 B2 | 11/2015 | Abe et al. | |
| 9,287,047 B2 | 3/2016 | Choi et al. | |
| 2006/0139848 A1* | 6/2006 | Kim | H01G 4/012 361/306.3 |
| 2006/0245141 A1* | 11/2006 | Shirasu | H01G 4/012 361/303 |
| 2008/0253059 A1* | 10/2008 | Eggerding | H01G 4/012 361/301.4 |
| 2009/0207554 A1* | 8/2009 | Iguchi | H01G 2/24 361/321.2 |
| 2009/0229860 A1* | 9/2009 | Shin | H01G 4/30 174/250 |
| 2010/0157506 A1* | 6/2010 | Togashi | H01G 4/012 361/303 |
| 2010/0188799 A1 | 7/2010 | Galvagni et al. | |
| 2011/0024175 A1* | 2/2011 | Satou | H01G 2/065 174/260 |
| 2011/0102969 A1 | 5/2011 | Togashi | |
| 2012/0151763 A1* | 6/2012 | Jung | H01G 4/30 29/846 |
| 2013/0049532 A1* | 2/2013 | Kim | H01G 4/30 310/311 |
| 2013/0229749 A1* | 9/2013 | Lee | H01G 4/12 361/321.2 |
| 2014/0259655 A1* | 9/2014 | Sato | H01G 4/30 29/832 |

FOREIGN PATENT DOCUMENTS

| | | |
|---|---|---|
| JP | H 09260207 A | 10/1997 |
| JP | 2000195754 A | 7/2000 |

* cited by examiner

MULTILAYER ELECTRONIC DEVICE HAVING IMPROVED CONNECTIVITY AND METHOD FOR MAKING THE SAME

CROSS REFERENCE TO RELATED APPLICATION

The present application claims filing benefit of U.S. Provisional Patent Application Ser. No. 62/575,626 having a filing date of Oct. 23, 2017, which is incorporated herein by reference in its entirety.

FIELD OF THE INVENTION

The present subject matter generally concerns improved component formation for multilayer electronic components. More particularly, the present subject matter relates to a multilayer electronic device having improved connectivity between the electrodes and terminals, and method for making the same.

BACKGROUND OF THE INVENTION

Many modern electronic components are packaged as monolithic devices, and may comprise a single component or multiple components within a single chip package. One specific example of such a monolithic device is a multilayer capacitor or capacitor array, and of particular interest with respect to the disclosed technology are multilayer capacitors with interdigitated internal electrode layers and corresponding electrode tabs. Examples of multilayer capacitors that include features of interdigitated capacitor (IDC) technology can be found in U.S. Pat. No. 4,831,494 (Arnold et al), U.S. Pat. No. 5,880,925 (DuPré et al.) and U.S. Pat. No. 6,243,253 B1 (DuPré et al.). Other monolithic electronic components correspond to devices that integrate multiple passive components into a single chip structure. Such an integrated passive component may provide a selected combination of resistors, capacitors, inductors and/or other passive components that are formed in a multilayered configuration and packaged as a monolithic electronic device.

In known exemplary assembly methodologies, multilayer capacitors have been formed by providing individual sheets of a ceramic dielectric cut from a previously prepared extended length or tape of the ceramic material. The individual sheets are silk screen printed with electrode ink through multiple sets of electrode patterns. Printed sheets are then stacked in multiple layers and laminated into a solid layer often referred to as a pad. The pad may then be cut into individual multilayer components, and further processing of multilayer components may be performed, for example, sintering of the pad and terminating of the individual components. Termination of the components may include applying a metal paint so as to come into contact with selected of the previously screen painted electrodes followed by another firing to secure the metal paint termination material to the capacitor.

During manufacturing, after the pad is cut into individual components and before the terminations are formed, a non-conductive coating may be applied to the components to protect and/or electrically insulate the internal elements (e.g., electrodes and dielectric layers) of the device. Such non-conductive coating, however, may unintentionally coat the exposed portions of the electrodes that are configured to electrically connect with the terminations, once formed.

Moreover, the ever-shrinking size of electronic components may make precisely cutting the pad along prescribed cutting lines into individual multilayer components difficult. Misalignment of the cutting operation may result in components that are defective (e.g., have an electrical short between the terminals), or may result in components that with reduced performance. For example, cutting misalignment may cause some electrodes to be disconnected from the terminals. This may undesirably reduce the capacitance of a multilayer capacitor or reduce the energy capability of a varistor. Inspecting the cutting locations of such multilayer components, however, requires destructive testing. For instance, because the electrode layers are concealed within the structure, determining the precision of the cutting operation requires grinding, or otherwise removing, a portion of the component to visually inspect the internal structure. Such destructive testing is both costly and inefficient.

Accordingly a multilayer component having improved electrical connectivity and a method for making the same would be welcomed in the art.

SUMMARY OF THE INVENTION

In view of the recognized features encountered in the prior art and addressed by the present subject matter, an improved multilayer electronic device and method for making the same has been developed.

In accordance with one embodiment of the present invention, a method is disclosed for making a multilayer electronic device. The method may include placing a screen printing mask on a layer of support material and printing a conductive pattern on a layer of support material using the screen printing mask. The conductive pattern may include a plurality of electrode shapes including respective central enlarged portions. The method may include cutting the layer of support material and conductive pattern along a plurality of cutting lines intersecting the central enlarged portions such that at least one of the plurality of electrode shapes is divided into a pair of electrodes along a cutting width. The cutting width may be indicative of a cutting accuracy associated with at least one of the cutting lines.

In accordance with another aspect of the present invention, a multilayer electronic device is disclosed including a plurality of layers. The plurality of layers may include electrodes, and at least one of the plurality of electrodes may include a main portion extending in a longitudinal direction. The main portion may have a main width in a lateral direction perpendicular to the longitudinal direction. The at least one of the plurality of electrodes may include a base portion having a maximum base width that is greater than the main width. The base portion may have a width profile in the longitudinal direction, and at least a portion of the width profile may be sloped at an angle with respect to the longitudinal direction that is greater than 0 degrees and less than 90 degrees.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Repeat use of reference characters throughout the present specification and appended drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a multilayer electronic device having improved electrical connectivity and method for making the same. The multilayer electronic device may include a plurality of dielectric layers interposed between alternating electrode layers. The electrode layers may include electrodes formed using screen printing and dicing processes. The multilayer electronic device may be configured as a capacitor, resistor, varistor, inductor and/or the like. Regardless of the configuration, the present inventors have discovered that through controlling the screen printing and dicing processes used to form electrodes, a multilayer electronic device can be formed that not only has improved electrical connectivity between the various electrodes and the terminals but also provides a simple and efficient method for inspecting the multilayer electronic devices.

For example, in some embodiments, electrode material may be screen printed on a plurality of inter-electrode support material layers to form electrode shapes thereon. The inter-electrode support material layers may be stacked to form a stack of layers, and the stack may be cut along cutting lines to form individual multilayer electronic devices. However, precisely cutting the structure on the cutting lines may be difficult, especially for smaller case size devices. For example, as is known in the art, the case size of electronic devices may be expressed as a four digit code (e.g., 2520), in which the first two digits are the length of the device in millimeters (or in thousandths of an inch) and the last two digits are the width of the device in millimeters (or in thousandths of an inch). For instance, common metric case sizes may include 2012, 1608, 0603. Precisely cutting a stack of layers, referred to as a "pad", to form devices having smaller case sizes, however, may be difficult because of the high degree of precision involved.

According to some embodiments of the present disclosure, a screen printing mask may be used to form electrode shapes on layers of support material. The screen printing mask may have openings having central enlarged sections resulting in the electrode shapes similarly having central enlarged portions. Cutting the stack of layers through the central enlarged portions may cut the electrode shapes into a pair of electrodes. Similarly such cutting may expose a portion of the newly formed pair of electrodes along an end face of the pad. The exposed portion of the electrodes may have an exposed width. According to aspects of the present disclosure, the exposed width may be indicative of a cutting accuracy, as explained in greater detail below. Thus, by inspecting the exposed width at the ends of the electrodes, the cutting accuracy of the cutting operation may be easily determined, for example, without destructively modifying the pad to inspect the internal structure.

Moreover, in some embodiments, the electrode shapes may have a central enlarged portion, as indicated above. Such a central enlarged portion may result in the electrodes having a base width greater than a main width. The enlarged base width may provide improved electrical connectivity to the terminals, once formed on the multilayer device. For instance, in some embodiments, a non-conductive coating may be applied before the terminals are formed on the device. In some instances, a portion of the non-conductive coating may be deposited on the exposed portions of the electrodes. The enlarged base width of the exposed portions, however, may improve electrical connective and/or prevent an electrical disconnect between the electrodes and terminals.

As indicated above, the multilayer electronic device may be configured as a capacitor, resistor, varistor, inductor and/or the like. Thus, the inter-electrode support material may be any suitable material for forming such devices. For instance, to form a capacitor inter-electrode support material may be a dielectric material including a ceramic, semiconductive, or insulating material, such as but not limited to barium titanate, calcium titanate, zinc oxide, alumina with low-fire glass, or other suitable ceramic or glass-bonded materials. Alternatively, the dielectric material may be an organic compound such as an epoxy (with or without ceramic mixed in, with or without fiberglass), popular as circuit board materials, or other plastics common as dielectrics. In these cases, the conductor is usually a copper foil which is chemically etched to provide the patterns. In still further embodiments, dielectric material may comprise a material having a relatively high dielectric constant (K), such as one of NPO (COG), X7R, X5R X7S, Z5U, Y5V and strontium titanate. In one example, the dielectric material may have a dielectric constant within a range from between about 2000 and about 4000.

To form a varistor, the inter-electrode support material may be a dielectric material, such as, for instance, barium titanate, zinc oxide, or any other suitable dielectric material. Various additives may be included in the dielectric material, for example, to produce or enhance the voltage-dependent resistance of the dielectric material. For example, in some embodiments, the additives may include oxides of cobalt, bismuth, manganese, or a combination thereof. In some embodiments, the additives may include oxides of gallium, aluminum, antimony, chromium, titanium, lead, barium, nickel, vanadium, tin, or combinations thereof. The dielectric material may be doped with the additive(s) ranging from about 0.5 mole percent to about 3 mole percent, and in some embodiments from about 1 mole percent to about 2 mole percent. The average grain size of the dielectric material may contribute to the non-linear properties of the dielectric material. In some embodiments, the average grain size may range from about 10 micrometers (μm) to 100 μm, in some embodiments, from about 20 μm to 80 μm.

The external terminations can be formed using any method generally known in the art. The external terminations may be formed using techniques such as sputtering, painting, printing, electroless plating or fine copper termination (FCT), electroplating, plasma deposition, propellant spray/air brushing, and so forth.

In one embodiment, the external terminations may be formed such that the external terminations are relatively thick. For instance, such terminations may be formed by applying a thick film stripe of a metal to exposed portions of internal electrode layers. Such metal may be in a glass matrix and may include silver or copper. As an example, such strip may be printed and fired onto the device. Thereafter, additional plating layers of metal (e.g., nickel, tin, solder, etc.) may be created over the termination strips such that the device is solderable to a substrate. Such application of thick film stripes may be conducted using any method generally known in the art (e.g., by a termination machine and printing wheel for transferring a metal-loaded paste over the exposed internal electrode layers). Examples of components with external terminations formed by baked terminations and metal films plated thereon are disclosed in U.S. Pat. No. 5,021,921 to Sano et al., which is incorporated by reference herein for all purposes.

The thick-plated external terminations may have an average thickness of about 150 μm or less, such as about 125 μm or less, such as about 100 μm or less, such as about 80 μm or less. The thick-plated external terminations may have an average thickness of about 25 μm or more, such as about 35 μm or more, such as about 50 μm or more, such as about 75 or more μm. For instance, the thick-plated external terminations may have an average thickness of from about 25 μm to about 150 μm, such as from about 35 μm to about 125 μm, such as from about 50 μm to about 100 μm.

In another embodiment, the external terminations may be formed such that the external termination is a thin-film plating of a metal. Such thin-film plating can be formed by depositing a conductive material, such as a conductive metal, on an exposed portion of an internal electrode layer. For instance, a leading edge of an internal electrode layer may be exposed such that it may allow for the formation of a plated termination.

The thin-plated external terminations may have an average thickness of about 50 μm or less, such as about 40 μm or less, such as about 30 μm or less, such as about 25 μm or less. The thin-plated external terminations may have an average thickness of about 5 μm or more, such as about 10 μm or more, such as about 15 μm or more. For instance, the external terminations may have an average thickness of from about 5 μm to about 50 μm, such as from about 10 μm to about 40 μm, such as from about 15 μm to about 30 μm, such as from about 15 μm to about 25 μm.

In general, the external termination may comprise a plated termination. For instance, the external termination may comprise an electroplated termination, an electroless plated termination, or a combination thereof. For instance, an electroplated termination may be formed via electrolytic plating. An electroless plated termination may be formed via electroless plating.

When multiple layers constitute the external termination, the external termination may include an electroplated termination and an electroless plated termination. For instance, electroless plating may first be employed to deposit an initial layer of material. The plating technique may then be switched to an electrochemical plating system which may allow for a faster buildup of material.

When forming the plated terminations with either plating method, a leading edge of the lead tabs of the internal electrode layers that is exposed from the main body of the device is subjected to a plating solution. By subjecting, in one embodiment, the device may be dipped into the plating solution.

The plating solution contains a conductive material, such as a conductive metal, is employed to form the plated termination. Such conductive material may be any of the aforementioned materials or any as generally known in the art. For instance, the plating solution may be a nickel sulfamate bath solution or other nickel solution such that the plated layer and external termination comprise nickel. Alternatively, the plating solution may be a copper acid bath or other suitable copper solution such that the plated layer and external termination comprise copper.

Additionally, it should be understood that the plating solution may comprise other additives as generally known in the art. For instance, the additives may include other organic additives and media that can assist in the plating process. Additionally, additives may be employed in order to employ the plating solution at a desired pH. In one embodiment, resistance-reducing additives may be employed in the solutions to assist with complete plating coverage and bonding of the plating materials to the device and exposed leading edges of the lead tabs.

The device may be exposed, submersed, or dipped in the plating solution for a predetermined amount of time. Such exposure time is not necessarily limited but may be for a sufficient amount of time to allow for enough plating material to deposit in order to form the plated termination. In this regard, the time should be sufficient for allowing the formation of a continuous connection among the desired exposed, adjacent leading edges of lead tabs of a given polarity of the respective internal electrode layers within a set of alternating dielectric layers and internal electrode layers.

In general, the difference between electrolytic plating and electroless plating is that electrolytic plating employs an electrical bias, such as by using an external power supply. The electrolytic plating solution may be subjected typically to a high current density range, for example, ten to fifteen amp/ft2 (rated at 9.4 volts). A connection may be formed with a negative connection to the device requiring formation of the plated terminations and a positive connection to a solid material (e.g., Cu in Cu plating solution) in the same plating solution. That is, the device is biased to a polarity opposite that of the plating solution. Using such method, the conductive material of the plating solution is attracted to the metal of the exposed leading edge of the lead tabs of the internal electrode layers.

Prior to submersing or subjecting the device to a plating solution, various pretreatment steps may be employed. Such steps may be conducted for a variety of purposes, including to catalyze, to accelerate, and/or to improve the adhesion of the plating materials to the leading edges of the lead tabs.

Additionally, prior to plating or any other pretreatment steps, an initial cleaning step may be employed. Such step may be employed to remove any oxide buildup that forms on the exposed lead tabs of the internal electrode layers. This cleaning step may be particularly helpful to assist in removing any buildup of nickel oxide when the internal electrodes or other conductive elements are formed of nickel. Component cleaning may be effected by full immersion in a preclean bath, such as one including an acid cleaner. In one embodiment, exposure may be for a predetermined time, such as on the order of about 10 minutes. Cleaning may also alternatively be effected by chemical polishing or harperizing steps.

In addition, a step to activate the exposed metallic leading edges of the exposed portions of the internal electrode layers may be performed to facilitate depositing of the conductive materials. Activation can be achieved by immersion in palladium salts, photo patterned palladium organometallic precursors (via mask or laser), screen printed or ink-jet deposited palladium compounds or electrophoretic palladium deposition. It should be appreciated that palladium-based activation is presently disclosed merely as an example of activation solutions that often work well with activation for exposed portions formed of nickel or an alloy thereof. However, it should be understood that other activation solutions may also be utilized.

Also, in lieu of or in addition to the aforementioned activation step, the activation dopant may be introduced into the conductive material when forming the internal electrode layers of the device. For instance, when the internal electrode layer comprises nickel and the activation dopant comprises palladium, the palladium dopant may be introduced into the nickel ink or composition that forms the internal electrode layers. Doing so may eliminate the palladium activation step. It should be further appreciated that some of the above activation methods, such as organometallic precursors, also lend themselves to co-deposition of glass formers for increased adhesion to the generally ceramic body of the device. When activation steps are taken as described above, traces of the activator material may often remain at the exposed conductive portions before and after termination plating.

Additionally, post-treatment steps after plating may also be employed. Such steps may be conducted for a variety of purposes, including enhancing and/or improving adhesion of the materials. For instance, a heating (or annealing) step may be employed after performing the plating step. Such heating may be conducted via baking, laser subjection, UV exposure, microwave exposure, arc welding, etc.

As indicated herein, the external termination comprises at least one plating layer. In one embodiment, the external termination may comprise only one plating layer. However, it should be understood that the external terminations may comprise a plurality of plating layers. For instance, the external terminations may comprise a first plating layer and a second plating layer. In addition, the external terminations may also comprise a third plating layer. The materials of these plating layers may be any of the aforementioned and as generally known in the art.

For instance, one plating layer, such as a first plating layer, may comprise copper or an alloy thereof. Another plating layer, such as a second plating layer, may comprise nickel or an alloy thereof. Another plating layer, such as a third plating layer, may comprise tin, lead, gold, or a combination, such as an alloy. Alternatively, an initial plating layer may include nickel, following by plating layers of tin or gold. In another embodiment, an initial plating layer of copper may be formed and then a nickel layer.

In one embodiment, initial or first plating layer may be a conductive metal (e.g., copper). This area may then be covered with a second layer containing a resistor-polymeric material for sealing. The area may then be polished to selectively remove resistive polymeric material and then plated again with a third layer containing a conductive, metallic material (e.g., copper).

The aforementioned second layer above the initial plating layer may correspond to a solder barrier layer, for example a nickel-solder barrier layer. In some embodiments, the aforementioned layer may be formed by electroplating an additional layer of metal (e.g., nickel) on top of an initial electrolessly or electrolytically plated layer (e.g., plated copper). Other exemplary materials for layer the aforementioned solder barrier layer include nickel-phosphorus, gold, and silver. A third layer on the aforementioned solder-barrier layer may in some embodiments correspond to a conductive layer, such as plated Ni, Ni/Cr, Ag, Pd, Sn, Pb/Sn or other suitable plated solder.

In addition, a layer of metallic plating may be formed followed by an electroplating step to provide a resistive alloy or a higher resistance metal alloy coating, for example, electroless Ni—P alloy over such metallic plating. It should be understood, however, that it is possible to include any metal coating as those of ordinary skill in the art will understand from the complete disclosure herewith.

It should be appreciated that any of the aforementioned steps can occur as a bulk process, such as a barrel plating, fluidized bed plating and/or flow-through plating termination processes, all of which are generally known in the art. Such bulk processes enable multiple components to be processed at once, providing an efficient and expeditious termination process. This is a particular advantage relative to conventional termination methods, such as the printing of thick-film terminations that require individual component processing.

As described herein, the formation of the external terminations is generally guided by the position of the exposed leading edges of the lead tabs of the internal electrode layers. Such phenomena may be referred to as "self-determining" because the formation of the external plated terminations is determined by the configuration of the exposed conductive metal of the internal electrode layers at the selected peripheral locations on the device.

Additional aspects of the above-described technology for forming thin-film plated terminations are described in U.S. Pat. Nos. 7,177,137 and 7,463,474 to Ritter et al., which are incorporated by reference herein for all purposes. It should be appreciated that additional technologies for forming device terminations may also be within the scope of the present technology. Exemplary alternatives include, but are not limited to, formation of terminations by plating, magnetism, masking, electrophoretics/electrostatics, sputtering, vacuum deposition, printing or other techniques for forming both thick-film or thin-film conductive layers.

Figure 1A:
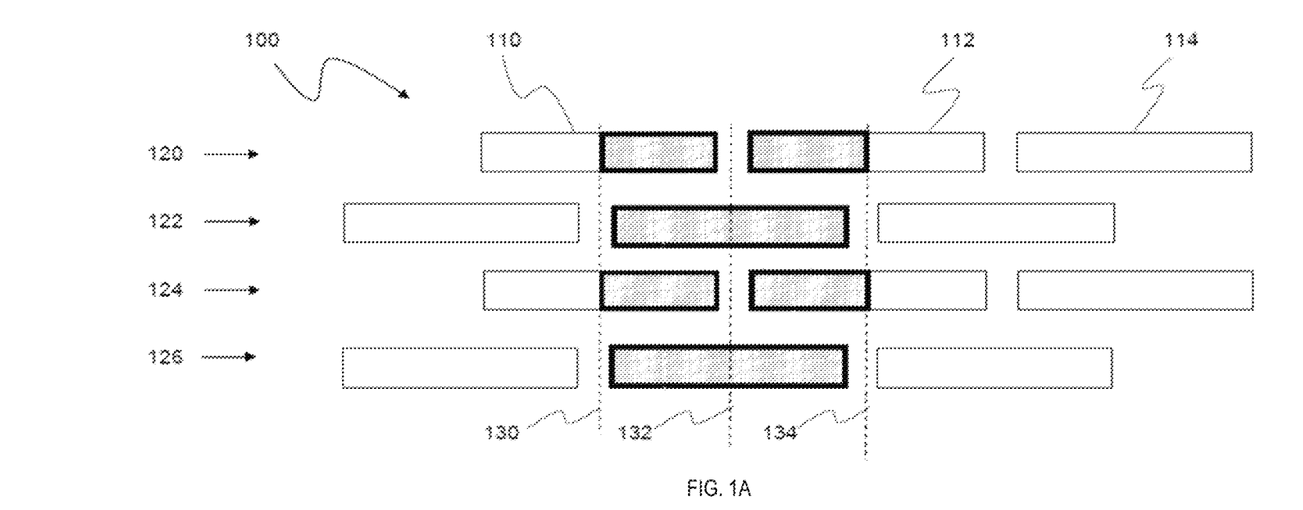
FIG. 1A illustrates a first screen printing mask that includes a plurality of openings for forming an embodiment of a multilayer electronic device in accordance with aspects of the present subject matter.
Figure 1B:
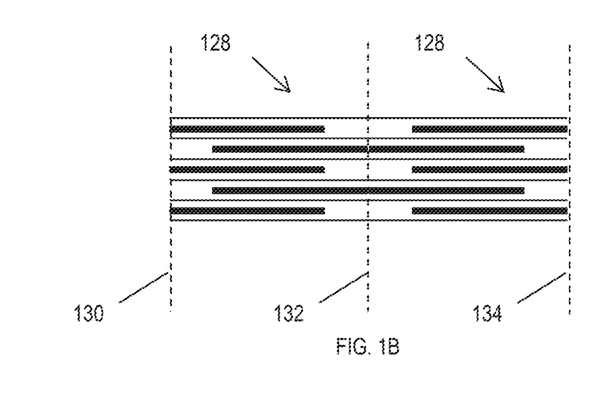
FIG. 1B illustrates a plurality of multilayer electronic device and cutting lines in accordance with aspects of the present subject matter.

Reference will now be made in detail to the presently preferred embodiments of the subject multilayer device. Referring now to the drawings, FIGS. 1A and 1B illustrate a first portion of sequential steps that may be followed in the production of one embodiment of a multilayer electronic device in accordance with the present subject matter. As shown in FIG. 1A, a first screen printing mask 100 may include a plurality of openings. Three openings 110, 112, 114, are illustrated in FIG. 1A for simplicity. It should be understood that the screen printing mask 100 may have greater than three openings, however. In some embodiments, each opening may generally have the same size and shape.

It should be noted that throughout the following descriptions of the various screen printing masks, portions of the masks are illustrated as clear elements while other portions are shaded. In both instances, the screens are open to allow passage of printing material as is understood by those of ordinary skill in the screen printing arts. Rather, shading has been used to draw particular attention to those areas for the purposes of discussion only. For example, those areas may representatively correspond to electrodes in a finished product.

With further reference to FIG. 1A, in accordance with aspects of the present disclosure, electrodes are printed on a plurality successive stacked layers. Four successive electrode layers 120-126 are illustrated in FIG. 1A for simplicity. The electrode layers 120-126 are formed on inter-electrode support material, which is omitted from FIG. 1A for clarity. In some embodiments, the layers of inter-electrode support material may include a dielectric material, for example. The electrode material may be printed on the support layers using the screen printing mask 100. For example, the screen printing mask 100 may be placed on a first layer of inter-electrode material. The first layer 120 of electrode material may be printed on a first layer of inter-electrode material through the plurality of openings 110, 112, 114 in the screen printing mask 100 to form a first conductive pattern. During this step, the screen printing mask 100 may be shifted a predetermined distance to the right as viewed from FIG. 1A. After printing the first layer 120, a second layer of inter-electrode material may placed or deposited on top of the first layer. The screen printing mask 100 may then be placed on the second layer of inter-electrode material and used to print a second layer 122 of electrode material to form a second conductive pattern. This process may be repeated for subsequent layers, for example, the third layer 124, fourth layer 126, and so on. After the desired number of layers are formed the stack of inter-electrode material and printed conductive patterns may be cut to form individual multilayer devices 128, as explained below.

It should be clearly understood that the illustration herein of a total of four print layers is exemplary only. In actual production, more or less layers may be provided to produce a component meeting desired electrical and physical characteristics. In some embodiments, screen printing masks having other patterns and/or shapes may be used to form other conductive patterns as desired. The conductive patterns described herein are merely exemplary.

Still referring to FIGS. 1A-1B, after the layers of the multilayer device are printed, individual devices 128 may be cut from the stack of layers along a plurality of cutting lines 130, 132, 134. For example, a first multilayer device 128 may be formed between cut lines 130 and 132, and a second multilayer device 128 formed between cut lines 132 and 134, and so on.

Figure 2A:
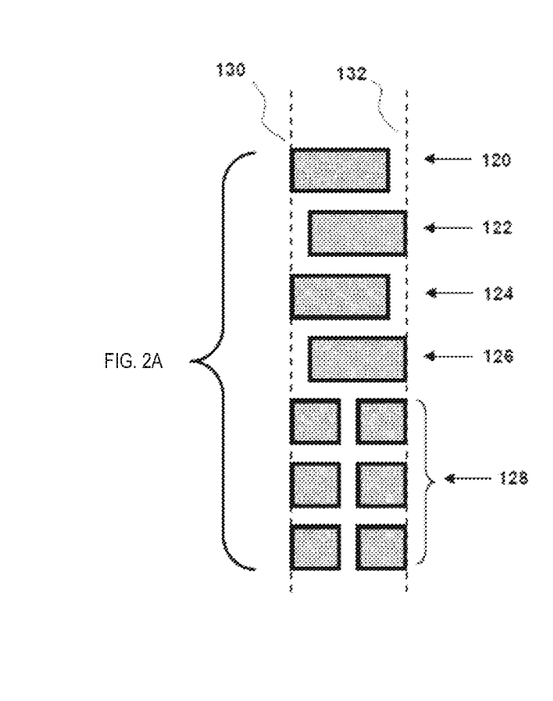
FIG. 2A illustrates one embodiment of a stack of screen printed layers in accordance with aspects of the present subject matter.
Figure 2B:
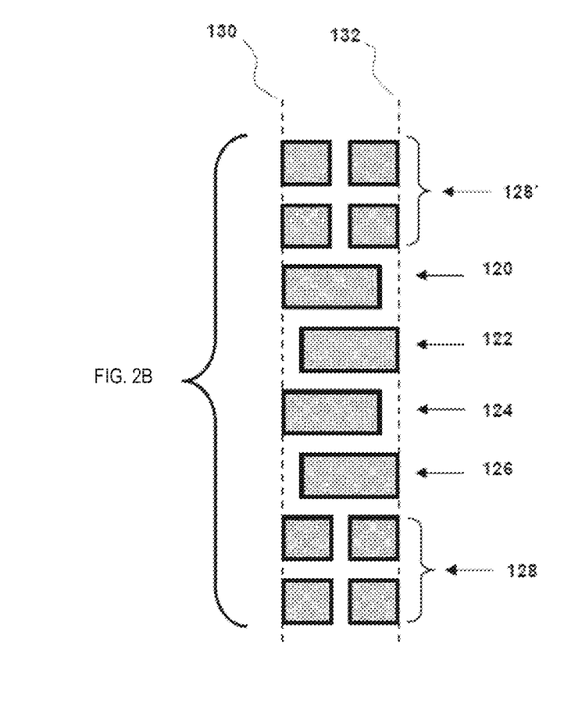
FIG. 2B illustrates another embodiment of a stack of screen printed layers in accordance with aspects of the present subject matter.

Referring to FIGS. 2A and 2B, in some embodiments, the screen printing mask 100 may be positioned to form shield or dummy electrodes 128, for example. Various configurations of layers may be formed depending on the desired properties of the multilayer device. After printing of the various layers 120-126 as discussed above with reference to FIGS. 1A, 1B, 2A, and 2B, the individual devices 128 may be fired using processes well known to those of ordinary skill in the art.

Figure 2C:
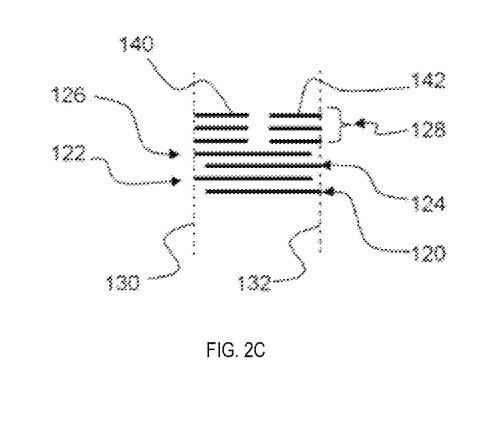
FIG. 2C is a side view of a stack of screen printed layers in accordance with aspects of the present subject matter.
Figure 2D:
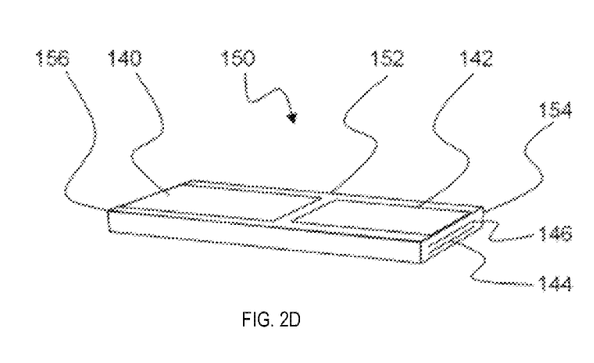
FIG. 2D is a perspective view of a multilayer device before external terminals are applied in accordance with aspects of the present subject matter.
Figure 2E:
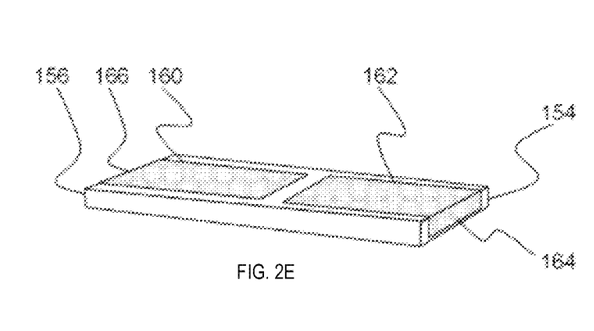
FIG. 2E is a perspective view of a multilayer device are external terminals are applied in accordance with aspects of the present subject matter.

Referring to FIGS. 2C through 2E, following stacking and printing, the pad may be cut into individual devices 150. For example, referring to FIG. 2D, the electrodes may have exposed portions 144, 146 along opposing face ends 154, 156 of the device 150. As explained in greater detail below, the exposed portions 144, 146 may have exposed widths that are indicative of the accuracy of the cutting operation.

After an initial firing, a non-conductive coating may be applied before terminations 160, 162, 164 are formed on the device 150. For example, in some embodiments, terminations 160, 162, 164 may be formed by applying a termination material to the end faces 154, 156. In some embodiments, the termination material may also be applied to exposed areas 140, 142 of the top electrodes, which may be shield or dummy electrodes 128. The terminations 160, 162 may be in electrical connection with the exposed end faces 144, 146 of the electrodes. In some embodiments, termination portions 162 and 164 may also continuously cover the top most electrode portion 142 and the exposed electrode portions at the respective end faces 154, 156 of the device 150, respectively.

Figure 3:
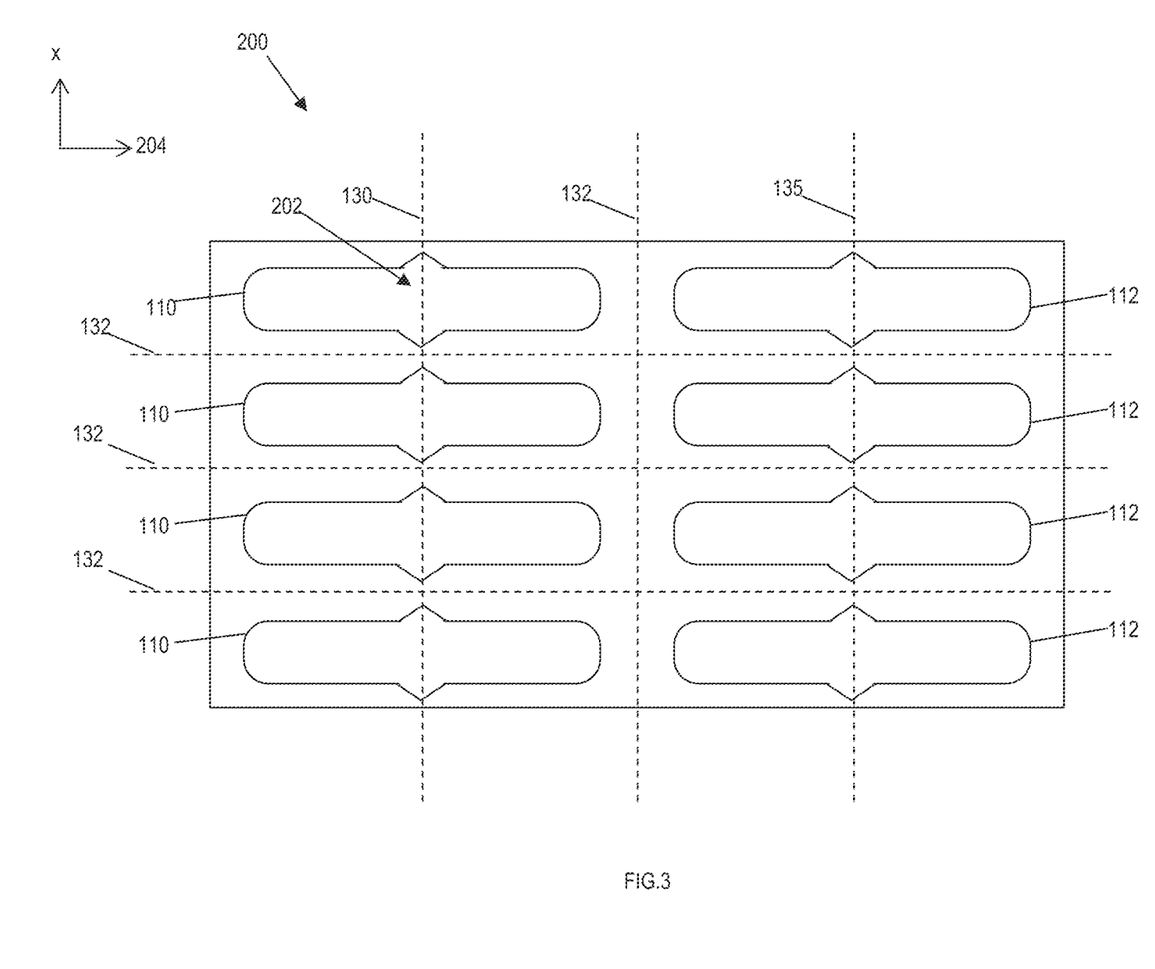
FIG. 3 illustrates a screen printing mask in accordance with aspects of the present subject matter.

Referring now to FIG. 3, an individual screen print 200 is illustrated in accordance with aspects of the present disclosure. The screen print 200 may have a plurality of openings 110, 112 that may be used to printed electrode material on the layers of inter-electrode material to form a multilayer device, for example as described above. At least one of the plurality of openings may have a central enlarged section 202. For example, in some embodiments, the central enlarged section 202 may be located in the middle of the opening 110 along the length of the opening in a longitudinal direction 204. For instance, the cut lines 130 may intersect the central enlarged sections 202 of the openings 110.

Figure 4A:
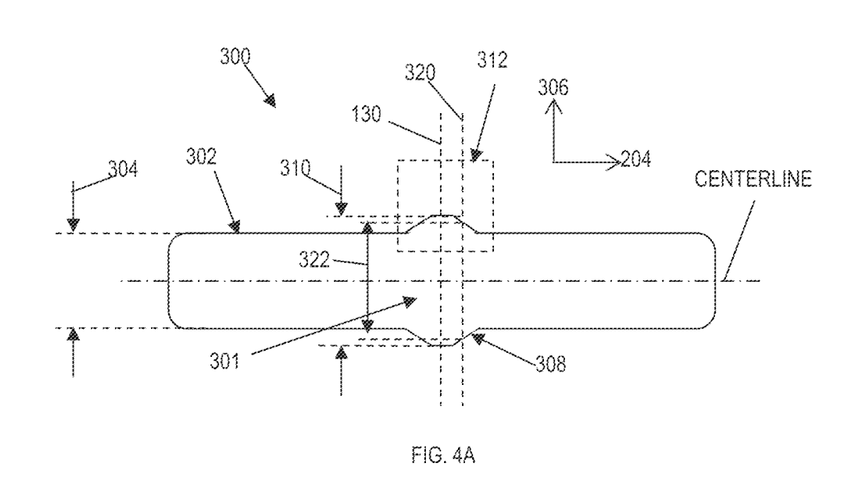
FIG. 4A illustrates an embodiment of an electrode shape printed on a support layer, specifically illustrating a central enlarged portion of the electrode shape in accordance with aspects of the present subject matter.

Referring to FIG. 4A, in some embodiments, the opening 100 may be shaped such that the opening 100 forms an electrode shape 300 on the layers of inter-electrode material, for example during a print process as described above. The electrode shape 300 may have a central enlarged portion 301 as a result of the central enlarged section 202 of openings 110 of the screen printing mask 100. The electrode shape 300 may have a main portion 302 extending in the longitudinal direction 204, and the main portion 302 may have a main width 304 in a lateral direction 306 perpendicular to the longitudinal direction 204. The central enlarged portion 301 may extend beyond the main width 304 in the lateral direction. For example, the electrode shape 300 may have a base portion 308 having a maximum base width 310 that is greater than the main width 304. The base portion 308 may have a width profile in the longitudinal direction 204. The width profile define the shape of the central enlarged portion 301 and/or base portion 308 relative to the main width 304 of the main portion 302.

Figure 4B:
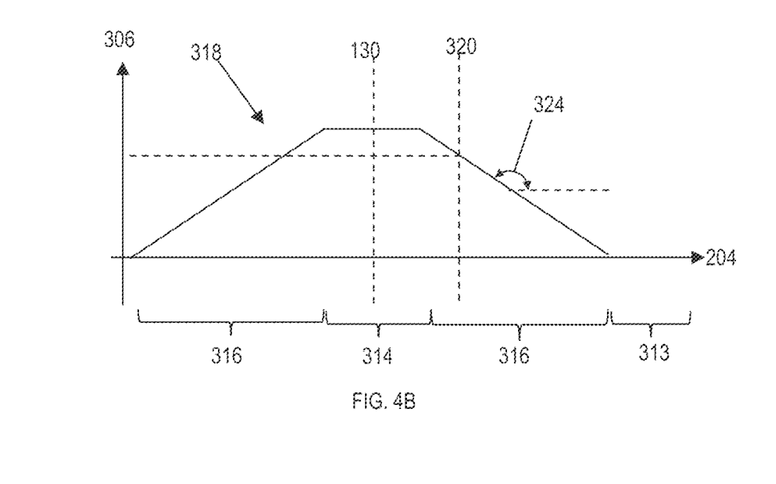
FIG. 4B illustrates a zoomed in portion of FIG. 4A.

As indicated above, in some embodiments, the electrode shapes 300 may be cut into a pair of electrodes along cutting lines 130. In some embodiments, the cutting lines 130 may extend substantially along lateral centerlines of the respective electrode shapes 300 in the longitudinal direction 204. FIG. 4B illustrates a width profile 318 of one embodiment of the central enlarged portion 301 of the electrode shape 300 before the electrode shape 300 is cut into the pair of electrodes. The width profile 318 may be defined as a distance in the lateral direction 306 that the central enlarged portion 301 (or base portion 308) extends beyond the main width 304 of the main portion 302. At least a portion of the width profile may sloped at an angle with respect to the longitudinal direction greater than 0 degrees and less than 90 degrees, as explained in greater detail below.

Referring to FIG. 4B, as discussed above, in some instances, the electrode shapes 300 may be cut along an actual cutting location 320 that may vary from a desired location of the cutting line 130. In some embodiments, the central enlarged portion 301 may include a flat region 314 located in the center of the central enlarged portion 301. In some embodiments, sloped or curved portions 316 may be disposed on either side of the flat region. Because of the difficulty associated with precisely cutting along the cutting line 130, the actual cutting location 320 may intersect the sloped or curved portion 316, instead of perfectly aligning with the desired location of the cutting line 130. As a result, the ends of the pair of electrodes formed along the face ends of the device during cutting may have a exposed width 322, for example as illustrated in FIG. 4A. In some instances, only the ends of the electrode pair may be visible once the pad of layers is printed, stacked, and cut into individual components. Thus, measuring the exposed width 322 may be a useful way of determining a cutting accuracy associated with the cutting operation. In some embodiments, the cutting accuracy may be defined as the longitudinal distance between the actual cutting location 320 and the desired location of the cutting lines 130. In other words, central enlarged portions 301 may be shaped such that the exposed width 322 may be indicative of the cutting accuracy. For example, the width profile 318 may have a known shape such that the exposed width 322 can be correlated with the width profile 318 to determine the cutting accuracy.

Still referring to FIG. 4B, the sloped or curved portion 316 may be sloped at an angle 324 with respect to the longitudinal direction that is greater than 0 degrees and less than 90 degrees. For instance, in some embodiments, the sloped or curved portion 316 may have a straight edge with a consistent slope along its length, for example as illustrated in FIG. 4B.

In some embodiments, the flat region 314 of the central enlarged portion 301 may have the maximum base width 310 of the electrode shape 300. The length in the longitudinal direction 204 of the flat region 314 may correspond to an acceptable deviation in the actual location of the cutting lines 130 from the desired location of the cutting lines 130. Thus, once the electrode shape 300 is cut into a pair of electrodes, if the exposed width 322 is less than the maximum base width 310 then it can easily be determined that the stack was cut along a cutting line 310 falling outside of an acceptable cutting region.

Figure 4C:
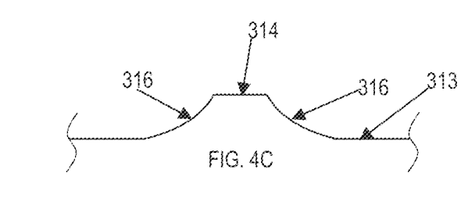
FIGS. 4C-4F illustrate various embodiments of the central enlarged portion of the electrode shape of FIG. 4A in accordance with aspects of the present subject matter.
Figure 4D:
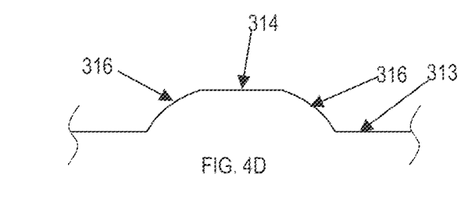
Figure 4E:
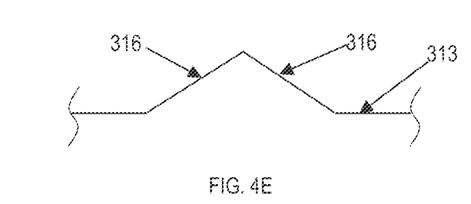
Figure 4F:
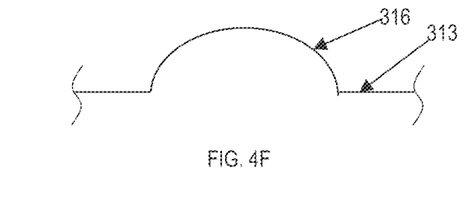

Referring to FIGS. 4C and 4D, in some embodiments, the curved portion 316 may be concavely arced, for example as illustrated in FIG. 4C. In some embodiments, the central enlarged portion 301 may be convexly arced, for example as illustrated in FIG. 4D. Referring to FIG. 4E, in some embodiments, the central enlarged portion 301 may not include a flat region 314 at all, and instead, the sloped portions 316 may form a point. In some embodiments, the point may align with a desired cutting location for the cutting line 130. Referring to FIG. 4F, in some embodiments, the central enlarged portion 301 may include a single curved portion 316, for example, having a semi-circular or elliptical shape.

Figure 5:
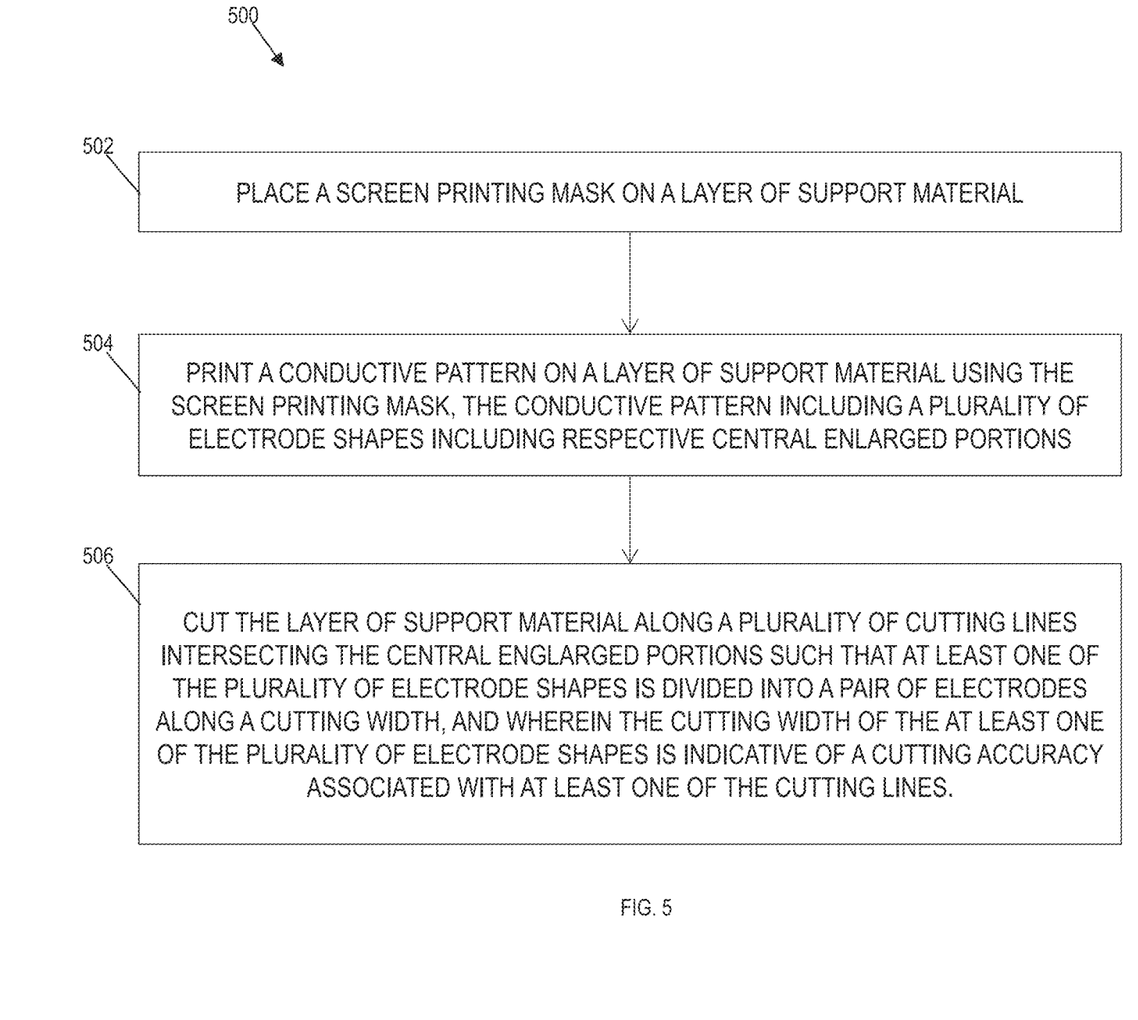
FIG. 5 illustrates one embodiment of method of making a multilayer electronic device in accordance with aspects of the present subject matter.

Referring to FIG. 5, aspects of the present disclosure are directed to a method 500 for making a multilayer electronic device. In general, the method 500 will be described herein with reference to the screen printing mask 100 and electrode shapes 300 described above with reference to FIGS. 1-4. However, it should be appreciated that the disclosed method 500 may be implemented with any suitable screen printing mask and electrode shapes to form any suitable multilayer device, including for example, capacitors, varistors, inductors, and device arrays of any suitable type. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 5, the method 500 may include, at (502), placing a screen printing mask 100 on a layer of support material. For example, the screen printing mask 100 may be placed through an automated process as is known in the art.

The method 500 may include, at (504), printing a conductive pattern on a layer of support material using the screen printing mask 100. The conductive pattern may include a plurality of electrode shapes 300 having respective central enlarged portions 301. For example, in some embodiments, printing the conductive pattern may include applying an electrode material through a plurality of openings 110 in the screen printing mask, and the plurality of openings 100 may include respective central enlarged sections 202 to form the central enlarged portions 301 of the plurality of electrode shapes 300. In some embodiments, printing the conductive pattern may include forming the central enlarged portions 301 of the plurality of electrode shapes 300 such that the central enlarged portions 301 include respective edge portions that slope towards a lateral centerline of the at least one of the plurality of electrode shapes at an angle with respect to the longitudinal direction 204 that is greater than 0 degrees and less than 90 degrees.

The method 500 may include, at (506), cutting the layer of support material and conductive pattern along a plurality of cutting lines 130. In some embodiments, the cutting lines 130 may intersect the central enlarged portions 301 such that at least one of the plurality of electrode shapes 300 is divided into a pair of electrodes. One or more of the resulting pair of electrodes may have an exposed width 322 that is indicative of a cutting accuracy.

In some embodiments, the method may also include determining the cutting accuracy based on the cutting width 322 of the at least one of the plurality of electrode shapes 300. The cutting accuracy for a given cutting line 130 may be defined as the longitudinal offset between the actual location 320 of the cutting line 130 and the desired cutting location of the cutting lines 130. In some embodiments, determining the cutting accuracy may include referencing a known width profile 318 that relates the cutting width 322 with the longitudinal offset between the at least one of the cutting lines 130 and the desired cutting location.

In some embodiments, the method 500 may also include applying a non-conductive coating to the multilayer electronic device. The non-conductive coating may be applied on less than all of the exposed portion (e.g., along less than the entire exposed width of the pair of electrodes). In some embodiments, the method 500 may also include forming a first terminal electrically connected with one of the pair of electrodes and a second terminal electrically connected with the other of the pair of electrodes formed by cutting the electrode shape 300 along the cutting lines 130.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifica-

What is claimed is:

1. A method of making a multilayer electronic device, the method comprising:
   placing a screen printing mask on a layer of support material;
   printing a conductive pattern on a layer of support material using the screen printing mask, the conductive pattern including a plurality of electrode shapes including respective central enlarged portions; and
   cutting the layer of support material and conductive pattern along a plurality of cutting lines intersecting the central enlarged portions such that at least one of the plurality of electrode shapes is divided into a pair of electrodes along a cutting width, and wherein the cutting width of the at least one of the plurality of electrode shapes is indicative of a cutting accuracy associated with at least one of the cutting lines; and
   determining the cutting accuracy based on the cutting width of the at least one of the plurality of electrode shapes, wherein the cutting accuracy is the longitudinal offset between the at least one of the cutting lines and the desired cutting location.

2. The method of claim 1, wherein printing the conductive pattern includes applying an electrode material through a plurality of openings in the screen printing mask, the plurality of openings including respective central enlarged sections.

3. The method of claim 1, wherein:
   printing the conductive pattern comprises forming the plurality of electrode shapes such that the plurality of electrode shapes have respective lengths extending in a longitudinal direction; and
   cutting the layer of support material and conductive pattern comprises cutting along the plurality of cutting lines that extend substantially in a lateral direction that is perpendicular to the longitudinal direction.

4. The method of claim 1, further comprising measuring the cutting width of the at least one of the plurality of electrode shapes.

5. The method of claim 1, wherein determining the cutting accuracy comprises referencing a width profile that relates the cutting width with the longitudinal offset between the at least one of the cutting lines and the desired cutting location.

6. The method of claim 1 wherein, printing the conductive pattern comprises forming the central enlarged portions of the plurality of electrode shapes such that the central enlarged portions include respective edge portions that slope towards a centerline of the at least one of the plurality of electrode shapes at an angle with respect to the longitudinal direction that is greater than 0 degrees and less than 90 degrees.

7. The method of claim 1, wherein cutting the layer of support material along the plurality of cutting lines comprises cutting the at least one of the plurality of electrode shapes substantially along a lateral centerline of the central enlarged portion.

8. The method of claim 1, further comprising forming a first terminal electrically connected with one of the pair of electrodes and a second terminal electrically connected with the other of the pair of electrodes.

9. A multilayer electronic device comprising a plurality of layers, the plurality of layers comprising electrodes, and at least one of the plurality of electrodes comprising:
   a main portion extending in a longitudinal direction, the main portion having a main width in a lateral direction perpendicular to the longitudinal direction; and
   a base portion having a maximum base width greater than the main width, the base portion having a width profile in the longitudinal direction, wherein the width profile is sloped at one or more angles with respect to the longitudinal direction, the one or more angles each being greater than 0 degrees and less than 90 degrees along the width profile from the main portion to an edge of the respective layer of the plurality of layers that comprises the at least one of the plurality of electrodes.

10. The multilayer electronic device of claim 9, wherein the flat region has a length in the longitudinal direction that is less than 200 μm.

11. The multilayer electronic device of claim 9, wherein the flat region has a length in the longitudinal direction and the multilayer electronic device has an overall length in the longitudinal direction, and wherein a ratio of the length of the overall length of multilayer electronic device to the length of the flat region is greater than about 5.

12. The multilayer electronic device of claim 9, wherein the base portion has a length in the longitudinal direction that is less than about 300 μm.

13. The multilayer electronic device of claim 9, wherein the multilayer electronic device has an overall length in the longitudinal direction and the base portion has a length in the longitudinal direction, and wherein a ratio of the length of the overall length of multilayer electronic device to the length of the base portion is greater than about 5.

14. The multilayer electronic device of claim 9, wherein the portion of the width profile that is sloped has a length in the longitudinal direction that is less than about 200 μm.

15. The multilayer electronic device of claim 9, wherein the width profile is sloped at a single constant angle with respect to the longitudinal direction between the main width at the main portion and the edge of the respective layer.

16. A multilayer electronic device comprising a plurality of layers, the plurality of layers comprising electrodes, and at least one of the plurality of electrodes comprising:
   a main portion extending in a longitudinal direction, the main portion having a main width in a lateral direction perpendicular to the longitudinal direction; and
   a base portion having a maximum base width greater than the main width, the base portion having a width profile in the longitudinal direction, wherein at least a portion of the width profile is sloped at an angle with respect to the longitudinal direction, greater than 0 degrees and less than 90 degrees, wherein the portion of the width profile that is sloped has a length in the longitudinal direction that is less than about 200 μm.

* * * * *